United States Patent
Cressman

(10) Patent No.: US 8,393,796 B2
(45) Date of Patent: Mar. 12, 2013

(54) HEAVY DUTY BEARING SUPPORT SYSTEM FOR ATV

(75) Inventor: Brian Mark Cressman, New Hamburg (CA)

(73) Assignee: Ontario Drive & Gear Limited, New Hamburg, Ontario (CA)

( * ) Notice: Subject to any disclaimer, the term of this patent is extended or adjusted under 35 U.S.C. 154(b) by 306 days.

(21) Appl. No.: 12/845,972

(22) Filed: Jul. 29, 2010

(65) Prior Publication Data

US 2012/0027333 A1 Feb. 2, 2012

(51) Int. Cl.
F16C 23/04 (2006.01)
F16C 23/08 (2006.01)

(52) U.S. Cl. ........ 384/495; 384/206; 384/210; 384/496; 384/498; 384/558

(58) Field of Classification Search ............... 384/191.1, 384/192, 206, 208–209, 213, 495–498, 558, 384/210
See application file for complete search history.

(56) References Cited

U.S. PATENT DOCUMENTS

| | | | | |
|---|---|---|---|---|
| 558,262 A | * | 4/1896 | Darling | 384/209 |
| 2,290,213 A | | 7/1942 | Shafer | |
| 2,676,853 A | | 4/1954 | Shafer | |
| 2,695,201 A | * | 11/1954 | Leister | 384/495 |
| 2,695,202 A | * | 11/1954 | Holbrook et al. | 384/498 |
| 2,695,203 A | * | 11/1954 | Andersen | 384/495 |
| 3,339,991 A | | 9/1967 | Howe, Jr. | |
| 3,683,474 A | * | 8/1972 | Young, Jr. | 29/898.043 |
| 4,094,559 A | | 6/1978 | Slusarski | |
| 4,296,977 A | * | 10/1981 | Ladin | 384/157 |
| 4,726,696 A | * | 2/1988 | Dickinson et al. | 384/486 |
| 5,423,130 A | * | 6/1995 | Gallet | 34/92 |
| 6,004,037 A | * | 12/1999 | Harris et al. | 384/206 |
| 6,238,096 B1 | | 5/2001 | Allen et al. | |
| 7,090,403 B2 | * | 8/2006 | Orlowski et al. | 384/213 |
| 7,182,169 B2 | * | 2/2007 | Suzuki | 384/208 |
| 7,396,017 B2 | * | 7/2008 | Orlowski et al. | 384/206 |
| 7,631,878 B1 | * | 12/2009 | Orlowski et al. | 384/192 |
| 2009/0190874 A1 | * | 7/2009 | Burner et al. | 384/558 |

FOREIGN PATENT DOCUMENTS

| | | | | |
|---|---|---|---|---|
| JP | 61084413 A | * | 4/1986 | |
| JP | 2002021867 A | * | 1/2002 | |
| SU | 372001 A | * | 4/1970 | |
| WO | WO 2006099014 A1 | * | 9/2006 | |

* cited by examiner

Primary Examiner — Marcus Charles
(74) Attorney, Agent, or Firm — Anthony Asquith Corp.

(57) ABSTRACT

In an amphibious ATV, the wheel bearings are housed in a spherical mounting-structure, because of possible angular misalignment. The spherical mounting-structure comprises separable primary and secondary elements. The new system provides that both elements are axially wide, being e.g as wide as the outer-race of the bearing. Now, the elements are highly resistant to every distortion, which means the mounting-structure can seal the bearings very effectively—both as to keeping dirt and water out, and keeping lubricant in.

18 Claims, 5 Drawing Sheets

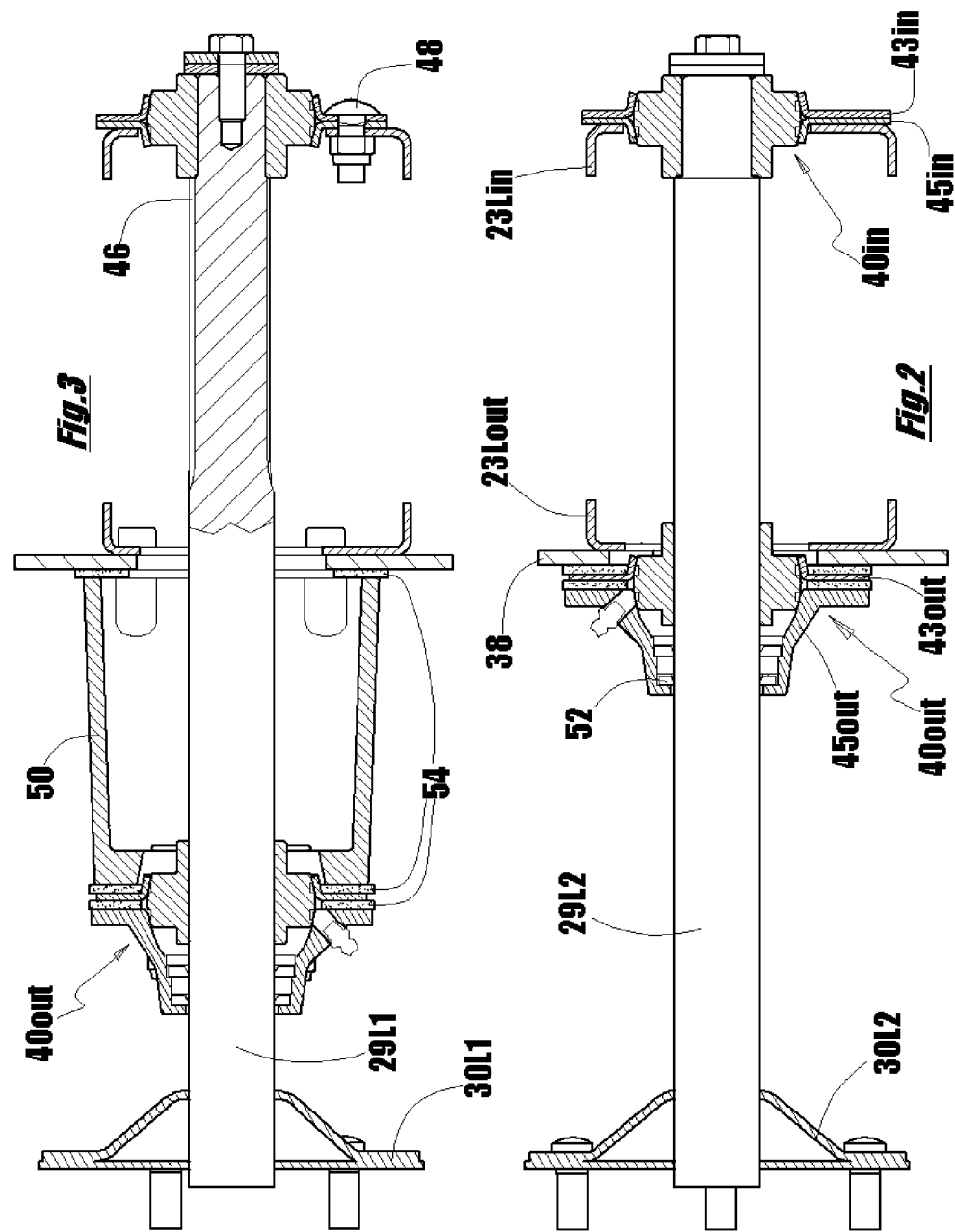

HEAVY DUTY BEARING SUPPORT SYSTEM FOR ATV

This technology relates to mountings for axle-bearings. The technology can be applied especially to an off-road or all-terrain vehicle (ATV), and especially to such a vehicle that also has an amphibious capability.

The wheel bearings of an amphibious ATV are exposed to varied and usually very hostile environments. Designers have to have in mind the need to prevent both the ingress of water and dirt into the bearing, and the egress of lubricant out from the bearing.

The proprietary bearings used in ATV wheel bearing units usually are of the spherically-mounted kind. Axle-shafts in ATVs being subject to angular misalignment, the outer-race of the bearing is carried in a mounting-structure that enables the outer-race to lie misaligned, i.e to lie at an angle relative to the fixed frame to which the mounting-structure is bolted or otherwise attached.

The proprietary bearings can be provided with manufactured-in seals. The built-in seals, however, while protecting the rolling balls or rollers between the inner and outer races of the bearing, do not protect the engagement between the (male) spherical outer race and the (female) spherical mounting-structure.

Traditionally, in order to provide for periodic re-lubrication of the rolling components of the bearings, an injection nipple has been provided in the mounting-structure, whereby the injected lubricant, on its way to the rolling components, passes between the male and female spherical surfaces. The lubricant therefore serves, not so much to permit smooth relative sliding movements of the spherical surfaces, but, rather, to wash out and to exclude any water or dirt which might have entered, or might tend to enter, between the surfaces. (It is usually not required that the spherical surfaces move relatively, after initial assembly, i.e once the initial angular misalignment has been accommodated.)

Lubricant is of course required for the balls or rollers between the races, in order to enable the continuation of friction-free rotation that is the main function of the bearing. Generally, facility for injecting lubricant into the bearing is provided in the form of an injection nipple on the mounting structure. Through-holes are provided in the outer race, to enable lubricant to travel through from between the spherical surfaces, and into the space between the races, in which the balls are located.

Thus, it is important for the designer to see to it that the spherical surfaces are kept dirt- and water-free, in order to ensure that the balls and races are kept dirt- and water-free.

It is an aim of the technology as presented herein, to provide for the sealing and protection of the space between the spherical surfaces, in a more cost-effective manner than has been the case hitherto.

LIST OF DRAWINGS

In the accompanying drawings:

FIG. 2 is a cross-sectional elevation of a conventional stub-axle and associated components of an ATV.

FIG. 3 shows a conventional stub-axle with extender.

Figure 1:
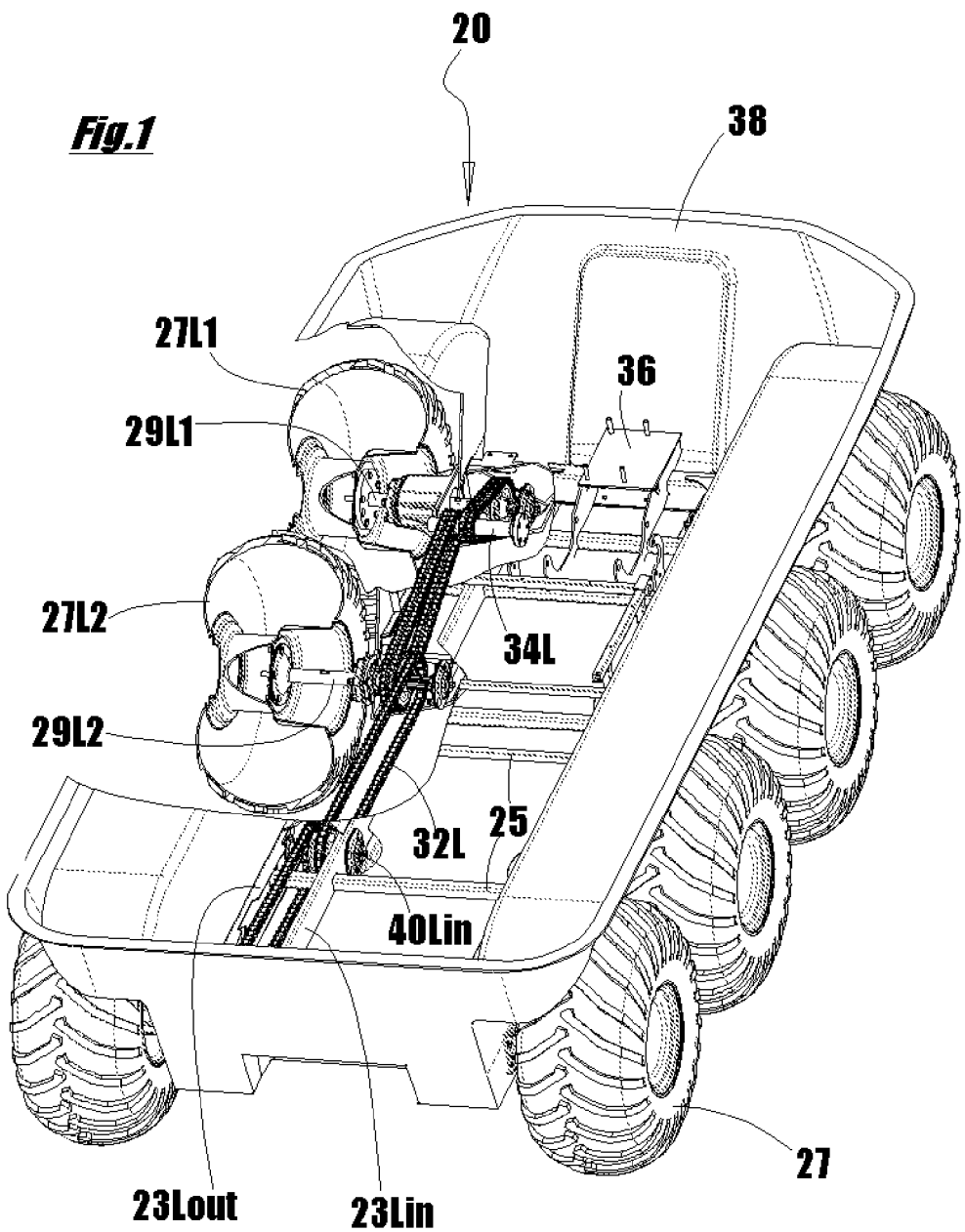
FIG. 1 is a pictorial view of a portion of an ATV.

The technology will now be further described with reference to the drawings. The ATV 20 illustrated in FIG. 1 is shown with its upper bodywork removed. The chassis of the vehicle is based on two pairs of steel channel members, being 23Lin and 23Lout on the left, and a corresponding pair (hidden) on the right. The channel-section chassis-members are braced by suitable cross struts 25.

The ATV has eight road-wheels 27, the tires of which are inflated to a low pressure, typically about ten psi or under. The intent, in this type of ATV, is that the soft tires make mechanical springs superfluous, in that all the required suspension movement, resilience, damping, etc, is accommodated by deflection of the soft tires.

The eight wheels are mounted on respective stub axles 29. The stub axle 29L2 of the second 27L2 of the left wheels is supported in a pair of bearings mounted respectively in the left-side inboard 23Lin and outboard 23Lout chassis-members. The road wheel 27L2 is mounted on a flange 30L2 (see FIG. 2) on the outboard end of the stub-axle 29L2.

All four left-side stub axles are so connected as to rotate in unison, by means of connecting drive-chains 32L, as shown. The left wheels can rotate, in unison as a set, independently of the right wheels, and the vehicle is steered by the driver controlling the left-right speed differential. The left wheels are driven through a left drive-shaft 34L, which is connected to the output shaft of an engine/transmission unit—which is not shown, but is mounted on the platform 36. The right wheels are driven through a corresponding right drive-shaft, right-side drive chains, right stub-axles, etc (hidden).

The left stub-axles 29L are connected to the left-side drive-chains 32L through respective chain-cogs splined to the left stub-axles, the splines (shown at 46 in FIG. 3) and chain-cogs being located, on the stub-axles, between the inboard and outboard chassis members 23Lin, 23Lout.

In FIG. 1 the upper bodywork of the ATV is not shown. The lower body, or tub 38, is a single piece of plastic that is moulded to the shape as shown. The tub 38 is watertight. It has basically no holes in it, apart from the eight stub-axle holes in the tub, through which the stub-axles 29 pass. The tub 38 is attached to the chassis by being clamped to the left and right outboard chassis members 23out, around the stub-axle holes in the tub; the moulded plastic tub 38 is basically not attached to the chassis except by being bolted to the outboard chassis members around the stub-axle holes.

Each stub axle 29 is supported in two bearings, being an inboard bearing unit 40 in (FIG. 2), which is bolted to the inboard chassis member 23 in; and an outboard bearing unit 40out, which is bolted to the outboard chassis member 23out.

The bearing units 40 include spherical mountings, to cater for the inevitable angular misalignments between the inboard and outboard bearings, which arise due to manufacturing tolerances on placement of holes, and other inaccuracies, as between the inboard and outboard chassis-members.

FIG. 2 shows a traditional bearing set-up. The bearings are provided with spherical mountings. In this case, the mounting structure of the inboard bearing unit 40 in has a primary element 43 in and a secondary element 45 in. Similarly, the mounting structure of the outboard bearing unit 40out has a primary element 43out and a secondary element 45out.

In both the inboard and the outboard bearing:
  the non-rotating outer-race of the bearing is formed with a male spherical surface, while the primary and secondary elements of the mounting structure, when brought together axially, define a corresponding female spherical surface;
  the non-rotating components of the bearing unit 40 are fastened to the appropriate chassis-member 23 in that the bearing mounting structure (being the combination of the primary 43 and secondary elements 45) is fastened directly to the chassis member 23 with bolts 48 (FIG. 3); the rotating inner-race of the bearing is fastened to the appropriate stub-axle 29 e.g by grub-screws, and rotates in unison the stub-axle 29.

Provision for replenishing the lubricating grease of the bearings takes the form of suitable nipples 49. Injected lubricant enters the space between the primary 43 and secondary elements 45 of the mounting structure of the bearing unit 40. In this traditional design, grooves formed in the spherical surface of the outer-race of the bearing serve to conduct the lubricant around the bearing. Holes in the outer race enable the lubricant to penetrate through into the balls or rollers of the bearing, between the races. The proprietary bearing unit (comprising the inner race and the outer race) is provided with and includes built-in seals, to retain the lubricant, and to exclude water and dirt from reaching rolling balls or rollers.

The front road-wheels of the ATV 20 generally are subjected to take more abuse than the second wheels. This extra abuse throws an additional strain on the outboard bearings of the front wheels. FIG. 3 shows one of the front wheels, and shows the provision of an extender 50. The extender 50 serves to reduce the strains on the outboard bearing 40out by moving the outboard bearing further outboard, i.e closer into the middle of the wheel.

The proximal end of the extender 50 is bolted firmly to the outboard chassis member 23out, and the mounting-structure of the outboard bearing is bolted firmly to the distal end of the extender.

In the conventional bearing mountings of FIGS. 2, 3, the primary element 43 is of sheet steel, which is formed, in a press, to its part-spherical shape. In the case of the inboard bearings 40 in, the secondary element 45 in also is of sheet steel formed, in a press, to its part-spherical shape. As to the outboard bearings, the secondary elements 45out are moulded, or cast, and include housings for extra seals, being seals 52, which are designed to prevent dirt and water entering the bearings.

Although the bearings themselves are manufactured with built-in seals—both to keep the lubricant in, and to keep dirt and water out—the typical service life of typical proprietary seals can be rather short, given the environment in which ATVs operate. The extra seals 52 can serve to lengthen the service life of the outboard bearings. The inboard bearings do not need extra seals, since they are not exposed to the harsh environment outside the ATV.

The outboard bearing units 40out also include gaskets 54, which are made of cork, or the like, i.e of a material, which, though it is elastically compressible when squeezed between plates that are bolted together, is so stiff that it cannot be substantially compressed when squeezed manually by finger pressure.

The splines by which the chain-cogs drive their respective stub-axles is shown at 46 in FIG. 3.

FIGS. 4-7 show an assembly that embodies the new technology. In the FIG. 4 example, the inboard bearing unit 40 in is the same as that in FIG. 2. The outboard bearing unit 56 is new.

Figure 4:
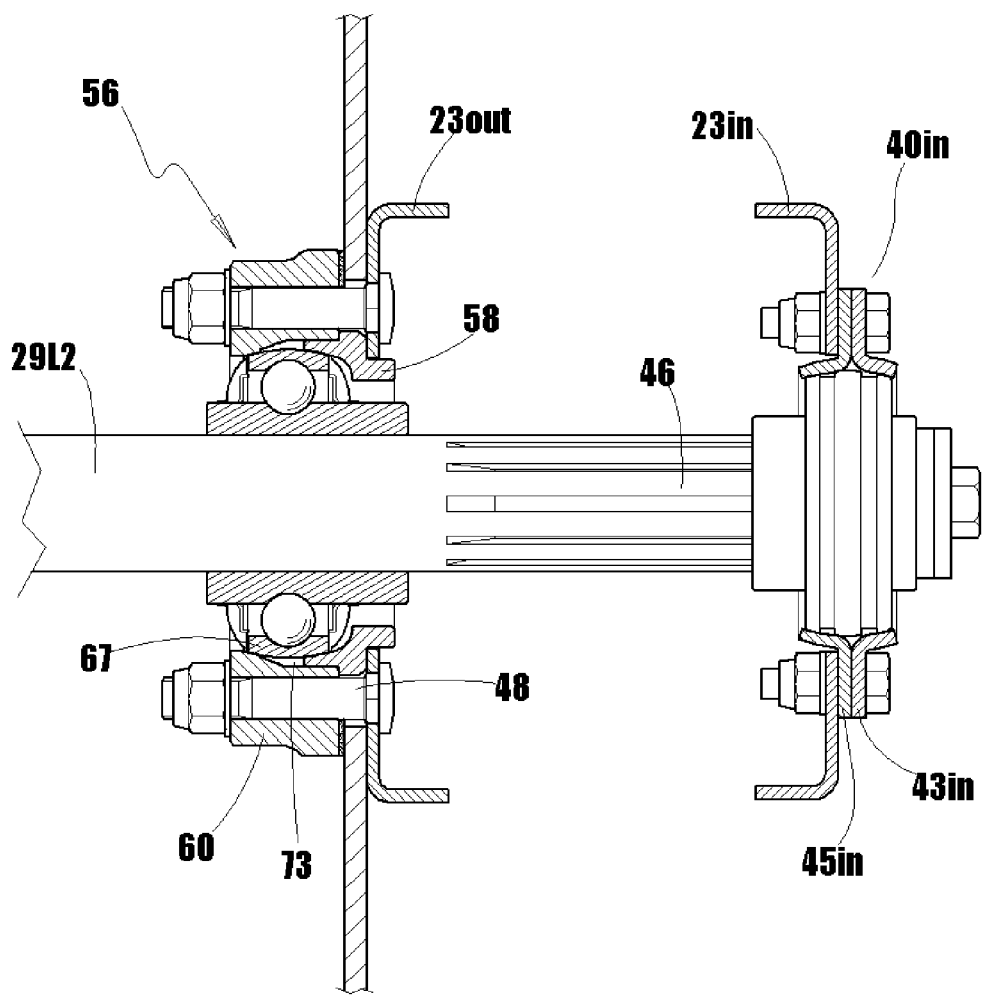
FIG. 4 is a similar view to FIG. 3 of the stub-axle of another ATV, which embodies the new technology.

In FIG. 4, the outboard bearing mounting structure, which defines the female spherical surface in which the outer race is contained and located, again has two elements. The primary element 58 is basically a solid of revolution, being of the same cross-sectional size and shape at every radius around its circumference. The primary element 58 is formed internally with a primary-portion 63 (FIG. 5) of the required female spherical surface. The female spherical surface corresponds to the male spherical surface 65 of the outer race 67 of the outboard bearing.

The remaining internal surfaces of the primary element 58 are so arranged as to be clear of the outer race 67 of the bearing—i.e to be incapable of touching the outer race at least over the range of angular displacement that might be encountered in the road-wheel stub-axle of an ATV.

Figure 6:
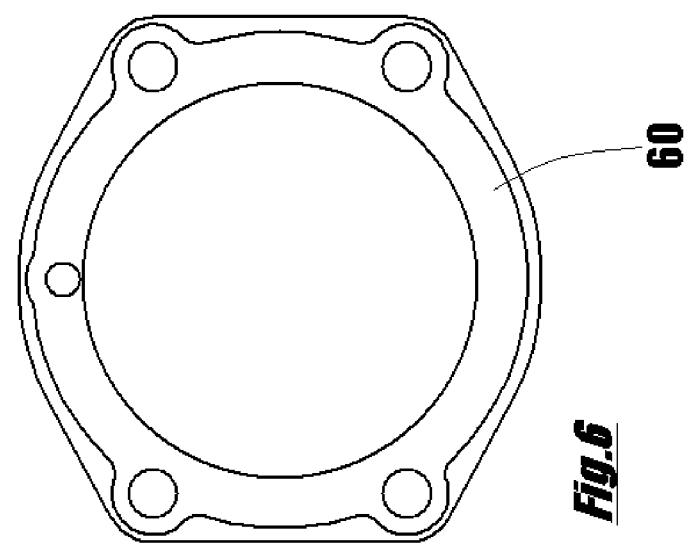
FIG. 6 is an end view of a secondary element component of FIG. 4.

The secondary element 60 of the outboard bearing mounting structure is moulded to shape, its end-on configuration being shown in FIG. 6. Internally, the secondary element 60 is formed with its own secondary-portion 69 of the required female spherical surface. The remaining internal surfaces of the secondary element 60 are so arranged as to be clear of the outer race 67 of the bearing.

Another portion 70 of the inwards-facing surfaces of the secondary element 60 is right-cylindrical in form. This portion is arranged as a tight-location fit with respect to a male right-cylindrical portion 72 of the primary element 58. The engagement of the male portion 72 within the female portion 70 ensures that the primary and secondary portions 63, 69 that make up the overall spherical surface are accurately matched, as to concentricity.

The primary element 58 of the mounting structure of the outboard bearing is also formed with a shoulder 74. The two elements are engaged together such that the shoulder 74 abuts directly against the abutment face 76 of the secondary element 60. The abutment of the shoulder 74 against the surface 76 ensures that the two portions 63, 69 that make up the overall spherical surface are accurately matched, as to complementary axial spacing.

Upon assembly, the combined spherical surface defined by the two elements 58, 60 is accurately determined by the fit of the cylindrical surfaces 70, 72, and by the abutment of the shoulder 74 against the surface 76. It will be understood that, upon assembly, the two elements 58, 60 then perform as if they were one integrated piece of metal: also it will be understood that, even if the bolts 48 were to be e.g overtightened, that would hardly affect the integrity and accuracy of the spherical surface.

The same bolts 48 that fix together the two elements 58, 60 of the bearing mounting structure also fix the bearing mounting structure to the outboard chassis-member 23out. When the bolts 48 are tightened, the chassis-member 23out contacts another shoulder 78 of the primary element 58.

The promontory 80 between the two shoulders 74, 78 of the primary element 58 is controlled as to its width. When the bolts are tightened, the width of the promontory 80 determines the width of the space between the chassis-member 23out and the abutment face 76 of the secondary element 60.

The thickness of the plastic material of the tub 38, and the thickness of a cork gasket 83, are present together in, and fill, that space. The designer sets the width of the promontory to be slightly smaller than the aggregate thickness of the tub 38 and the gasket 83, so that the gasket and tub are substantially compressed together when the bolts are tightened. The designer also sets the width of the promontory such that the plastic and the cork materials can be sufficiently compressed that the shoulder 74 abuts tightly against the abutment face 76.

If desired, a similar cork gasket can be placed between the plastic of the tub and the chassis-member—in which case the designer would adjust the width of the promontory accordingly, again ensuring that the shoulder 74 makes tight contact against the abutment face 76, when the bolts are tightened.

The fit of the portion 70 into the portion 72 should be a tight one (i.e there should be no more than about ¼ mm radial free-play between the two portions, even under an adverse tolerance build-up) in order to ensure the integrity of the two-element spherical cavity in which the outer race of the bearing is received.

The fit between the hole 84 in the chassis member 23out and the inboard cylindrical portion 85 of the primary element 58 is not so critical; a looser radial clearance would be appropriate here. Similarly, the radial fit of the tub plastic over the promontory 80 is not critical, and a correspondingly large clearance there can be accommodated.

As mentioned: together, the primary and secondary portions 63, 69 together define the female spherical surface that is required in order to properly locate the outer race 67 of the outboard bearing. As shown in FIG. 4, the two elements 58, 60 are so configured as to provide an annular cavity 73 between the two portions 63, 69 of the inwards-facing spherical surface. One function of this cavity 73 is to provide a reservoir or plenum for lubricant, whereby lubricant injected into the bearing unit is distributed circumferentially all around the bearing. Through-holes (not shown) in the outer race 67 of the bearing enable the lubricant to pass through from the cavity 73 into the rolling components (balls or rollers) of the bearing.

One of the benefits of arranging the two elements of the bearing mounting structure in the manner illustrated in FIGS. 4-7 is that the tightness and accuracy of the fit of the two elements, when bolted tightly together, is such that it can be (virtually) guaranteed that no dirt or liquid can enter the internal cavity 73 between the two elements. Therefore, the built-in seals of the proprietary sealed-bearing are all that is needed for providing an adequately long service life.

Another benefit of arranging the two elements of the bearing mounting structure in the manner illustrated in FIGS. 4-7 is that the two elements substantially do not distort, and thus do not tend to separate from each other. The primary element 58, for example, may be characterized as having the shape of a basically-cylindrical sleeve, having significant axial length—at least, when compared with the basically plate-like form of the element 43out (FIG. 2). The amount by which the sleeve-shaped element 58 can distort is minuscule, compared with the potential for distortion of a plate-shaped element. Thus, the tendency of the two elements 58, 60 of the bearing mounting, in FIG. 4, to separate apart from each other, is (practically) zero, enabling the bearing inside to remain clean and dry and well-lubricated.

Also, it is beneficial not to have to provide the extra seals 52 (FIGS. 2, 3). The housing in which such seals are carried is fixed to the chassis of the vehicle, and therefore any angular misalignment of the stub-axle causes the stub-axle to be laterally displaced eccentrically relative to the extra seals. Such lateral displacement can be enough that the lip of the seal, though pressed very tightly against the stub-axle over a western sector of the stub-axle, makes little or no contact over the eastern sector of the stub-axle. If that happens, the extra seal might as well not be present.

So, in FIGS. 2, 3, apart from the fact of the expense of providing the extra seals 52, plus the need to find room for the seals and housing in a place where space is at a premium, the seals can turn out to be quite ineffectual if the angular misalignment of the stub-axle is at all significant. Again, arranging the two elements of the bearing mounting structure in the manner illustrated in FIGS. 4-7 (virtually) eliminates ingress of dirt and water into the cavity between the elements, whereby the built-in seals—which always remain concentric and do not suffer lateral displacement when the stub-axle lies at an angle—are all that is needed to provide a long service life.

Figure 7:
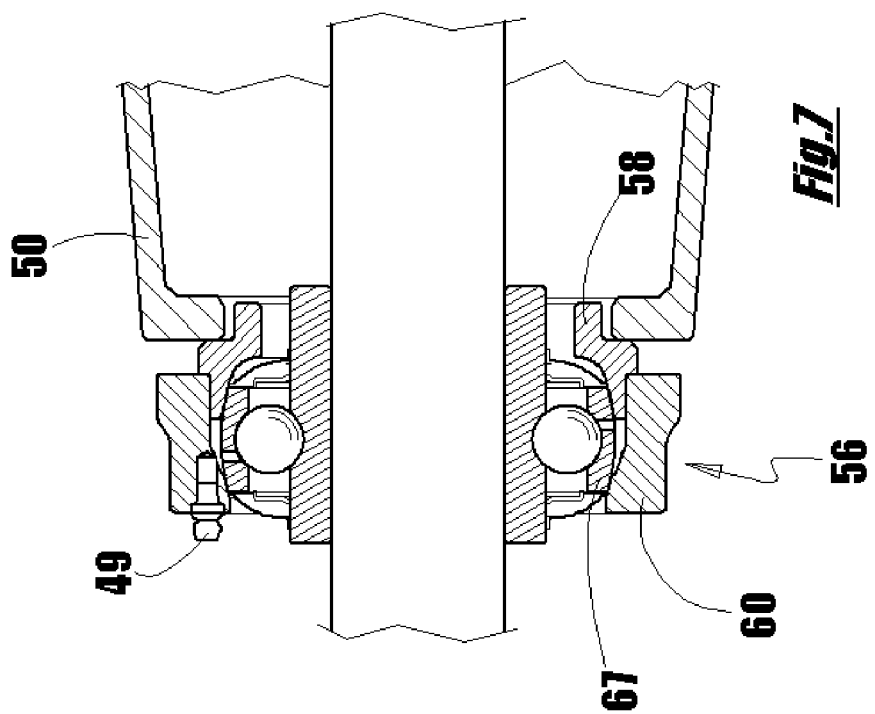
FIG. 7 is a sectional view of another stub-axle.

FIG. 7 shows a typical manner in which lubricant can be injected into the outboard bearing, on a regular service basis. The port in the secondary element, in which the nipple 49 is housed, breaks through into the clearance space between the elements. Servicing of the bearings requires that the road wheels be removed, which can be tiresome, but the fact that the bearing is kept so clean and dry, as described, means that lubricant is well-retained in the bearing, allowing service intervals to be extended.

For servicing purposes, access holes can be provided in the rims of the road-wheels, and in the attachment flanges 30. For servicing, the barrel of the grease gun can be passed through the access holes, and can be applied directly to the nipple carried on the mounting-structure. It is advantageous for the nipple 49 to be aligned axially (FIG. 7), for ease of engagement with the grease gun.

Figure 5:
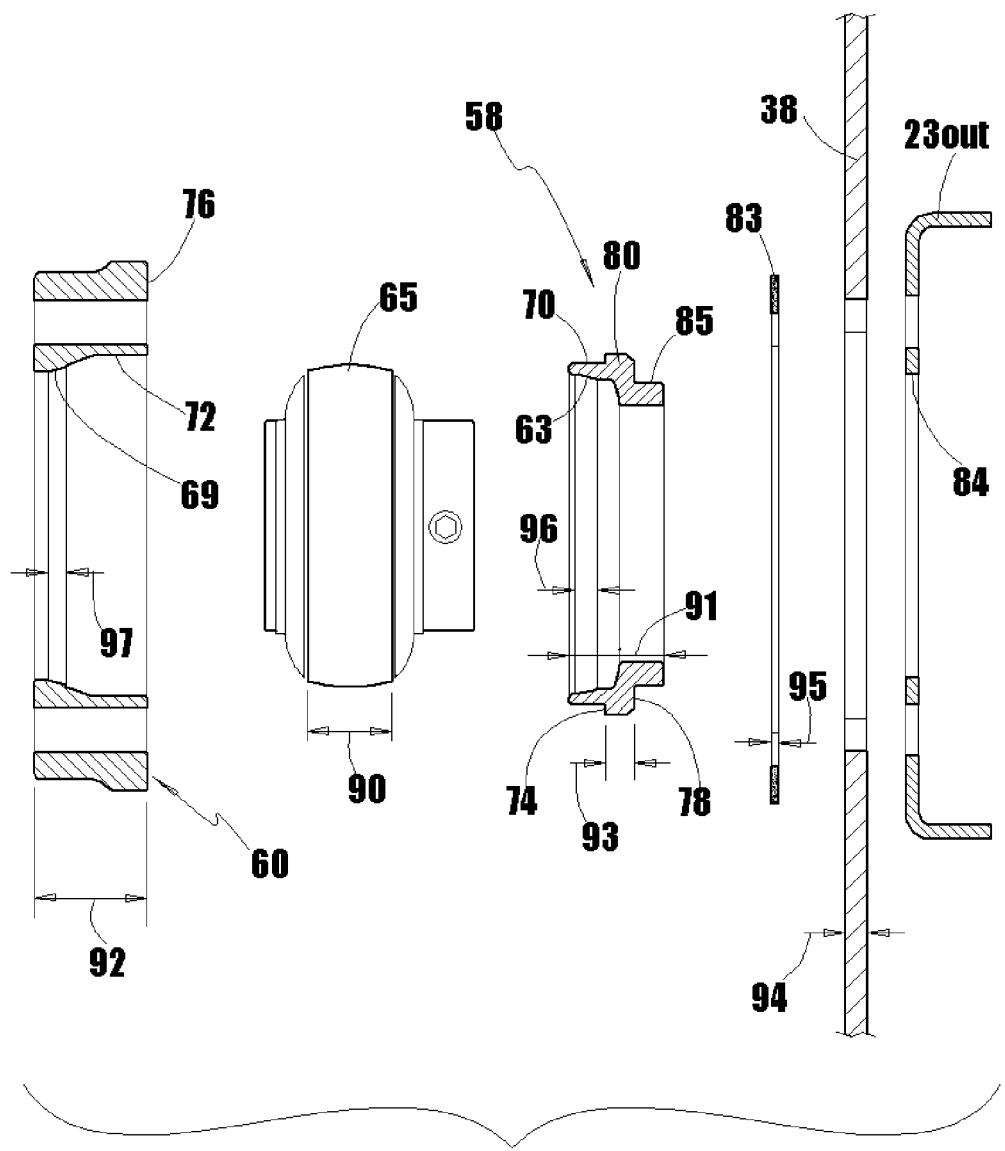
FIG. 5 is an exploded view of some of the components shown in FIG. 4.

The axial widths and thicknesses of some of the components of the bearing unit will now be described. As shown in FIG. 5:

90 is the axial width axW-race of the outer race 67 of the outboard bearing;

91 is the overall axial width axW-prim of the primary element 58;

92 is the overall axial width axW-secy of the secondary element 60;

93 is the width of the promontory 80, as defined by the shoulders 74, 78;

94 is axial thickness of the plastic material of the under-body or tub 38;

95 is the axial thickness of the e.g cork gasket 83;

96 is the axial width of the inwards-facing primary spherical portion;

97 is the axial width of the inwards-facing secondary spherical portion.

The overall axial width of the primary element is axW-prim; the overall axial width of the secondary element axW-secy; the axial width of the outer race of the bearing is axW-race; axW-prim plus two mm is more than axW-race (for example, where the outer race is eighteen mm wide, the primary element should be more than sixteen mm wide). Similarly, the width of the secondary element axW-secy should be greater than axW-race less two mm.

Preferably, in the new technology, the primary element of the mounting structure is as wide, overall, as the width of the outer race of the bearing. Preferably, also, the secondary element is also as wide as the outer race. It is permissible for the elements to be less wide than the outer race, but only, as mentioned, to be e.g two mm less wide than the outer race.

Both elements having this large axial width, the tendency of the whole mounting structure (comprising the primary and secondary elements) to distort in such manner that separation of the elements might tend to occur, is practically eliminated. Of course, even flimsy elements, when bolted together, will be well-locked together in the immediate vicinity of the bolts; it is the zones between the bolts where separation might or does occur. It is noted that if just one of the elements were able to distort, between the bolts, that would be enough to destroy the bearing. By making both elements axially wide, i.e both as wide as the outer race of the bearing, it can be assured that the elements remain tightly pressed together all around their circumference, even in the zones between the bolts.

The two elements of the mounting structure can be bolted together side-by side, such that the aggregate width of the two elements would be the simple sum of their overall widths, and would be equal to twice the width of the outer race, or more. Preferably, however, the designer should provide some degree of radial overlap of the elements, whereby the aggregate width of the bolted-together elements is less than double the width of the outer race. But, even with overlap, the aggregate width of the two elements usually would be more than about 1.5 times the width axW-race of the outer race.

Although described herein primarily in the ATV application, the new technology can be applied to other products, generally, in which an axle or shaft is mounted between two chassis-members.

Some of the components and features in the drawings have been given numerals with suffixes, which indicate inboard/outboard, etc versions of the components. The numeral without the suffix has been used herein to indicate the components generically.

Terms of orientation (e.g "inboard/outboard, "left/right", and the like) when used herein are intended to be construed as follows. The terms being applied to a device, that device is distinguished by the terms of orientation only if there is not one single orientation into which the device, or an image of the device, could be placed, in which the terms could be applied consistently.

Geometrical terms used herein, such as "cylindrical", "vertical", "flat", and the like, which define respective theoretical constructs, are intended to be construed purposively.

A reference herein to a component being "integrated rigidly into" another component means that the two components are either formed from one common, monolithic, piece of material, or, if formed separately, are fixed together so firmly and rigidly as to be functionally and operationally equivalent to having been formed from one common piece of material. Where an element is defined as having a particular dimension, it is not required that the element must be monolithic, as far as that dimension is concerned; it is enough, where the element is in two or more pieces, for the pieces to be secured together in the said rigidly integrated manner.

The scope of the patent protection sought herein is defined by the accompanying claims. The apparatuses and procedures shown in the accompanying drawings and described herein are examples.

The numerals used in the drawings may be summarized as:

| | |
|---|---|
| 20 | ATV |
| 23 | chassis-members, generically |
| 23L | left-side chassis-members, generically |
| 23in | inboard chassis-members, generically |
| 23out | outboard chassis-members, generically |
| 23Lin | inboard left-side chassis-member |
| 23Lout | outboard left-side chassis-member |
| 25 | cross struts and braces |
| 27 | road wheels, generically |
| 27L1 | left front wheel |
| 27L2 | left second wheel |
| 29 | stub-axles, generically |
| 29L1 | stub-axle of left front wheel |
| 29L2 | stub-axle of left second wheel |
| 30L2 | wheel attachment flange |
| 32L | left-side drive chains, generically |
| 34L | left-side drive shaft |
| 36 | engine mounting platform |
| 38 | tub; lower body |
| 40 | bearing units, generically |
| 40in | inboard bearing units, generically |
| 40Lin | left-side inboard bearing units |
| 40out | outboard bearing units, generically |
| 43 | primary elements of mounting structures, generically |
| 43in | primary element of inboard bearing mounting structure |
| 43out | primary element of outboard bearing mounting structure |
| 45 | secondary elements of mounting structures, generically |
| 45in | secondary element of inboard bearing mounting structure |
| 45out | secondary element of outboard mounting structure |
| 46 | splines |

| | |
|---|---|
| 48 | fixing bolts - mounting structure to chassis member |
| 49 | lubrication nipples |
| 50 | extender |
| 52 | extra seals |
| 54 | cork gaskets |
| 56 | outboard bearing unit (FIG. 4) |
| 58 | primary element of 56 |
| 60 | secondary element |
| 63 | spherical portion of internal surface of 58 |
| 65 | spherical external surface of outer race of bearing |
| 67 | outer race of outboard bearing |
| 69 | spherical portion of internal surface of 60 |
| 70 | cylindrical portion of external surface of 58 |
| 72 | cylindrical portion of internal surface of 60 |
| 73 | clearance space between 63 and 69 |
| 74 | outboard-facing shoulder on 58 |
| 76 | abutment face on 60 |
| 78 | inboard-facing shoulder on 58 |
| 80 | promontory between 74 and 78 |
| 83 | cork gasket |
| 84 | hole in 23out |
| 85 | inboard cylindrical portion of 58 |

The invention claimed is:

1. A spherical bearing unit for an axle, wherein:
   the unit includes a bearing, having an outer race with a spherical outer surface;
   the outer race of the bearing is mounted in a mounting structure comprising primary and secondary elements;
   the two elements are bolted together axially;
   the bearing unit is so configured that the two elements together define a female spherical surface, inside and between which the outer race of the bearing is located;
   the overall axial width of the primary element plus two mm is greater than the axial width of the outer race of the bearing; and
   the overall axial width of the secondary element plus two mm is greater than the axial width of the outer race of the bearing.

2. As in claim 1, wherein the overall axial width of the primary element is greater than the axial width of the outer race of the bearing.

3. As in claim 1, wherein the overall axial width of the secondary element is greater than the axial width of the outer race of the bearing.

4. As in claim 1, wherein the primary and secondary elements are so configured that one partially overlies the other, radially.

5. As in claim 1, wherein:
   the primary element includes a right-cylindrical portion, and the secondary element includes a right-cylindrical portion of opposite gender;
   the two right-cylindrical portions, when the elements are bolted together, are of such a tight fit relatively as to ensure that the respective spherical portions of the elements, which make up the overall female spherical surface of the mounting-structure, are accurately matched, as to concentricity.

6. A spherical bearing unit on an axle of a vehicle, wherein:
   the vehicle has a chassis-member;
   the unit includes a bearing, having an outer race with a spherical surface;
   the outer race of the bearing is mounted in a mounting structure comprising primary and secondary elements;
   the two elements are bolted together;
   the unit is bolted to an outboard-facing surface of the chassis-member;
   the two elements together define a female spherical surface in which the outer race of the bearing is located;

the overall axial width of the secondary element plus two mm is greater than the axial width of the outer race of the bearing;

the primary element is formed with a radially-protruding promontory;

the promontory has an outboard-facing surface and an inboard-facing surface;

the outboard-facing surface of the promontory lies in direct contact with an inboard-facing surface of the secondary element; and the inboard-facing surface of the promontory lies in direct contact with the outboard-facing surface of the chassis-member.

7. As in claim 6, wherein:
the unit is so structured that the following items form a bolted-together stack:
(a) the outboard-facing surface of the chassis-member;
(b) the promontory of the primary element; and
(c) the inboard-facing surface of the secondary element.

8. As in claim 6, wherein the chassis-member includes an extension, and the said outboard-facing surface of the chassis-member is an outboard-facing surface provided on the extension.

9. As in claim 6, wherein the bearing unit is so arranged in the vehicle that the secondary element does not make direct contact with the chassis-member.

10. As in claim 6, wherein the unit is arranged to provide bearing support for the axle of a road wheel of the vehicle.

11. As in claim 6, wherein the primary element, plus two mm, also is greater than the axial width of the outer race of the bearing.

12. As in claim 6, wherein the chassis-member is formed as folded sheet metal.

13. As in claim 6, wherein the bearing unit is a component of an amphibious ATV.

14. As in claim 6, wherein:
the bearing unit includes bolts, which are pitched around the axis of the bearing;
the bolts pass through corresponding bolt-holes in the chassis-member and in the secondary element;
the bolts are tightenable in an axial direction, and the bolts, when tightened:
(a) clamp the outboard-facing surface of the chassis-member against the inboard-facing surface of the promontory of the primary element; and
(b) clamp the outboard-facing surface of the promontory of the primary element against the inboard-facing surface of the secondary element.

15. As in claim 14, wherein:
the outboard-facing body-gasket surface of the chassis member is one with the outboard-facing surface of the chassis member;
the inboard-facing body-gasket surface of the secondary element is one with the inboard-facing surface of the secondary element.

16. As in claim 6, wherein:
the bearing unit includes a body member of the vehicle and a gasket, at least one of which is significantly compressible;

the aggregate axial thickness of the body member and the gasket, when not compressed together, is termed the body-gasket-thickness BGT of the unit;

the outboard-facing body-gasket surface of the chassis member is spaced apart from an inboard-facing body-gasket surface of the secondary element, by a distance of axial spacing termed the body-gasket-spacing BGS of the unit;

the body member and the gasket lie sandwiched between the outboard-facing body-gasket surface of the chassis-member and the inboard-facing body-gasket surface of the secondary element;

the body-gasket-spacing BGS is smaller than the body-gasket-thickness BGT;

whereby the body member and the gasket lie compressed between the secondary element and the chassis member.

17. As in claim 16, wherein the arrangement of the bearing unit is such that:
the inboard-facing surface of the promontory being in contact with the outboard-facing surface of the chassis-member;
the outboard-facing surface of the promontory being in contact with the inboard-facing surface of the secondary element;
further tightening of the bolts cannot further compress the gasket and body member.

18. A spherical bearing unit for an axle, wherein:
the unit includes a bearing, having an outer race with a spherical surface;
the outer race of the bearing is mounted in a mounting structure that includes primary and secondary elements;
the unit includes bolts, by which the two elements are bolted together axially;
the primary element includes a primary spherical portion of the female spherical surface, and the axial width of the primary spherical portion is no more than about half the overall width of the primary element;
the secondary element includes a secondary spherical portion of the female spherical surface, and the axial width of the secondary spherical portion is no more than about half the overall width of the secondary element;
when the elements are bolted together, the primary and secondary spherical portions together define a female spherical surface in which the outer race of the bearing is located;
when the two elements are bolted together, an outboard-facing surface of the primary element lies in direct contact with an inboard-facing surface of the secondary element; whereby
the respective spherical portions of the elements, which make up the overall female spherical surface of the mounting-structure, are accurately matched, as to axial spacing;
the elements are so configured that, upon being bolted together, a clearance space is created between the respective spherical portions of the elements;
a lubricant injection nipple located in one of the elements communicates with the clearance space; and
a through-hole in the outer race communicates that clearance space with rolling elements of the bearing.

* * * * *